June 20, 1967    J. W. LIPNITZ ET AL    3,327,171
STATIC OVERCURRENT RELAY WITH VARIABLE
TIME-CURRENT CHARACTERISTICS
Filed May 24, 1965      2 Sheets-Sheet 1
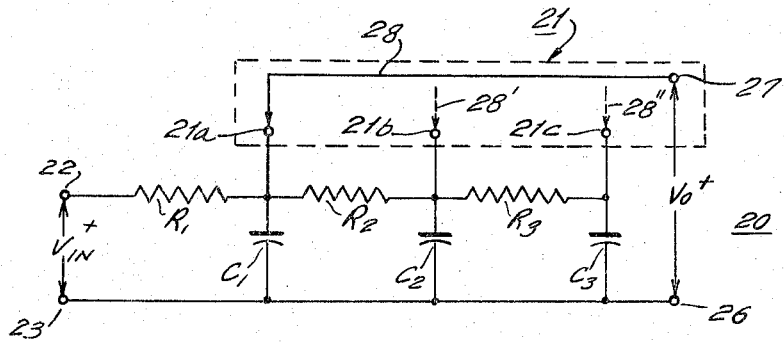
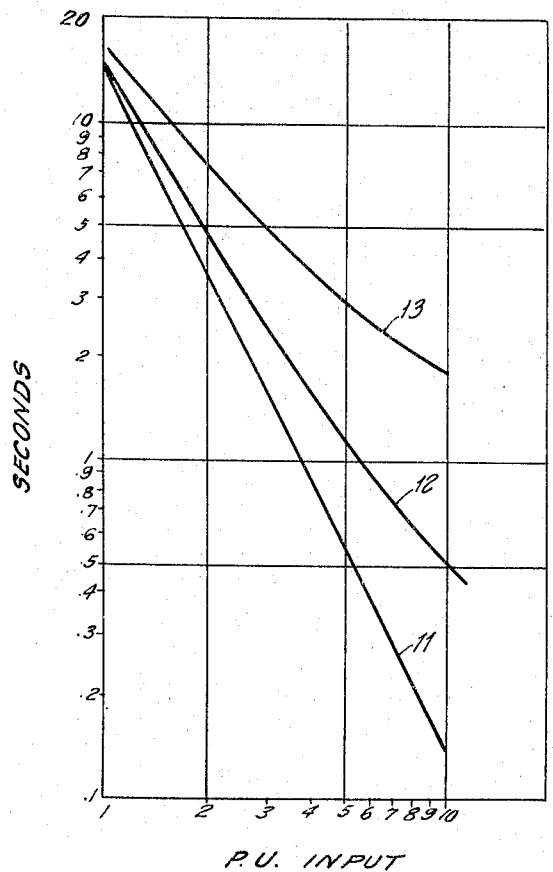
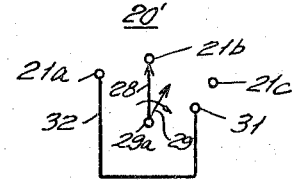
INVENTORS
JAMES W. LIPNITZ
STANLEY E. ZOCHOLL
BY
OSTROLENK, FABER, GERB & SOFFEN
ATTORNEYS

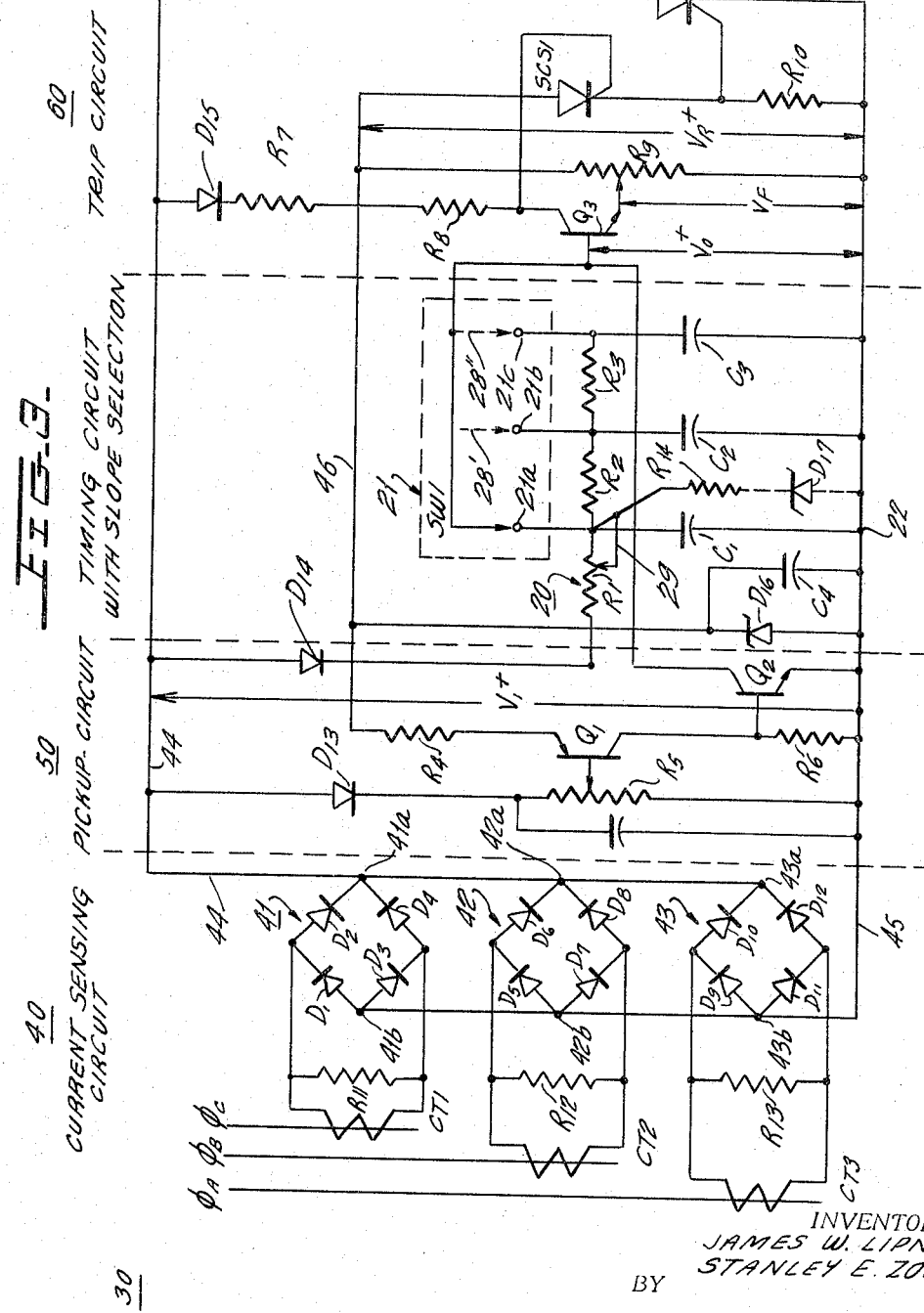

# United States Patent Office 3,327,171
Patented June 20, 1967

3,327,171
STATIC OVERCURRENT RELAY WITH VARIABLE TIME-CURRENT CHARACTERISTICS
James W. Lipnitz, Cherry Hill, N.J., and Stanley E. Zocholl, Philadelphia, Pa., assignors to I-T-E Circuit Breaker Company, Philadelphia, Pa., a corporation of Pennsylvania
Filed May 24, 1965, Ser. No. 459,532
11 Claims. (Cl. 317—36)

The instant invention relates to current sensing means and more particularly to static overcurrent relay means employing solid state circuitry and which comprises a timing circuit and switch means for selecting the desired time-current characteristic, which the overcurrent relay means is to obey.

The use of electromechanical overcurrent relay means is well known to the prior art. Such electromechanical devices operate as inverse time elements for the protection of electrical transmission networks and the like wherein slight overload current conditions is a tripping operation after a substantially long period of time and wherein extremely large overload current conditions initiate a tripping operation after only a very brief interval of time. Typically the time-current characteristic takes the form $I^2t=K$, where $t=$elapsed time, $I=$network current and $K=$a constant. It can clearly be seen from this equation that as overload current increases the value of $t$ must decrease rather appreciably to retain the relationship given above.

Electromechanical overload current sensing means have recently been replaced by static overcurrent relay devices which are comprised of solid state components such as resistors, capacitors, diodes, transistors, silicon controlled rectifiers, and the like. Such solid state circuits have distinct advantages over electromechanical devices in that:

Maintenance problems are appreciably diminished due to the fact that the solid state circuits have no moving parts and do not generate an appreciable amount of heat (as is the case where vacuum tube devices require heater filaments for their operation); solid state circuits have appreciably faster reset times after clearance of a fault condition; overshoot problems are greatly reduced; solid state circuits are substantially immune to shock and vibration. One typical static overcurrent relay device is set forth in detail in copending U.S. application Ser. No. 403,208, entitled Static Overcurrent Relay, filed Oct. 12, 1964, by S. E. Zocholl et al. and assigned to the assignee of the instant invention. In the static overcurrent relay device described in the above copending application, passive elements such as resistors and capacitors are employed in a timing circuit in such a manner as to yield a time-current relationship as described above. It should be noted that electrochemical overcurrent relay devices and indeed present day static overcurrent relay devices are so designed as to have only one time-current characteristic peculiar to the device. In present day applications it should be noted that three basic characteristics of time versus current are in general use in order to provide system protection. These time-current characteristics are defined as follows:

(1) Extremely inverse relationship or $I^2t = K$. This curve has a slope of two when plotted on log-log paper.

(2) Very inverse relationship or $It=K$. This curve has generally a slop greater than one, but less than two, when plotted on log-log paper.

(3) Inverse relationship. This curve has a slope of one or less than one when plotted on log-log paper.

There is presently no overcurrent relay means of either the static or electromechanical variety which has built in flexibility making it adaptable for use in any one of the three above described inverse relationships.

It is therefore one object of the instant invention to provide a static overcurrent relay means which is designed so as to be usable in networks in which any one of the above identified inverse relationships may exist.

One preferred embodiment of the instant invention is comprised of a plurality of current sensing means each being inductively coupled to one conductor or phase of a multiphase system such as for example a conventional three phase power distribution system. Each of the inductively coupled current sensing means full wave rectifies the inductively coupled signal and simultaneously impress their outputs upon the input to the timing circuit which is designed to generate the appropriate time-current characteristic.

Since any voltage, no matter how small, which may be impressed upon the timing circuit will cause the timing circuit to build up to that voltage level, a pickup circuit means is provided to prevent any output voltage from the current sensing means to be impressed upon the timing circuit until the minimum overload condition which is to be monitored is developed by at least one of the current sensing means. Thus, the pickup circuit disables the timing circuit until the minimum overload level to be monitored occurs, at which time the outputs of the current sensing means are coupled to the timing circuit.

The output of the timing circuit is developed after a predetermined time, dependent upon the voltage input thereto, and is employed to enable a trip circuit as soon as the minimum overload voltage level is achieved for the purpose of initiating a tripping operation of a circuit breaker or other protective device in order to isolate the portion of the transmission network experiencing the overload condition from the generating source of the network.

The timing circuit is comprised of a plurality of passive circuit elements and is coupled to the input of the trip circuit through adjustable switch means which may be manually manipulated for the purpose of coupling different node points of the timing circuit to the trip circuit input depending upon which inverse characteristic it is desired to have the timing circuit simulate. The passive circuit elements each cooperate with the adjustable switch means in a different manner depending upon the time-current characteristic desired, but only the switch means need be manipulated and no changes whatsoever need be made to the passive elements of the timing circuit in order to produce the desired inverse characteristic. Thus, the design of the static overcurrent relay means of the instant invention is readily adaptable for use in any transmission or power network having any one of the above identified inverse type characteristics with no changes whatsoever being made to the static relay means other than appropriate positioning of the adjustable switch means.

In the case where a very shallow slope, i. e. where a slope of very close to zero is desired to be obtained, additional fixed voltage means may be added to the timing circuit to still further reduce the slope of the time-current characteristic obtained. In the instant invention this fixed voltage means may take the form of series connected resistor and Zener diode means coupled across one branch of the timing network for the purpose of still further reducing the inverse characteristic, when the switch means is in the position which yields the smallest inverse characteristic slope. The fixed voltage means may be permanently wired within the circuit or if desired may be placed under control of the timing circuit switch means through a second switch arm mechanically coupled with the first switch arm so as to decouple the fixed voltage source from the circuit until the switch means is adjusted to cause the timing circuit to develop the smallest time-current characteristic slope.

It is therefore another object of the instant invention to provide a novel static overcurrent relay means capable of yielding any one of a variety of time-current characteristics.

Another object of the instant invention is to provide novel static overcurrent relay means for use in protecting power transmission lines and the like comprising novel timing circuit means employing switch means adjustable to provide any one of a plurality of time-current characteristics.

These and other objects of the instant invention will become apparent when reading the accompanying description and drawings in which:

FIGURE 1a is a schematic diagram showing a timing-circuit which may be employed in the device of the instant invention.

FIGURE 2 is a plot showing the time-current characteristics which the timing circuit of FIGURE 1 may develop.

FIGURE 3 is a schematic diagram showing a static overcurrent relay means employing the timing circuit of FIGURE 1.

FIGURE 4 is a diagrammatic representation of an alternative switch means which may be employed in the overcurrent relay means of FIGURE 3.

FIGURE 2 is a plot 10 prepared in log-log scale showing the three main time-current relationships which are found in power transmission networks and which it is significant to emulate for overload current monitoring functions. The curves represent the relationship between time and input voltage (which is directly proportional to current). Curve 11 represents the extremely inverse characteristic which is given by the equation $I^2t=K$, the quantities of which have been described previously. This curve has a slope of two (2) in log-log scale.

Curve 12 represents the very inverse characteristic given by the equation $It=K$. This curve has a slope lying between one and two in log-log scale.

The inverse relationship is shown by curve 13 and has a slope which is equal to or less than one in log-log scale.

FIGURE 1 shows the timing circuit 20 which is comprised of switch means 21 having the function of selecting the node point from which the timing circuit output voltage is taken.

A D.C. voltage $V_{in}$ is applied to the input nodes 22 of the timing circuit. The voltage $V_{in}$ is proportional to the input current with the input voltage being applied in a manner to be more fully described. The timing circuit 20 is comprised of passive circuit elements R1–R3 and C1–C3. The output voltage $V_0$ appears across the timing circuit output terminal 26 and the output terminal 27 of switch means 21. The switch means 21 is provided with a manually adjustable contact arm 28 having a first end electrically connected to terminal 27 and a second end selectively engagable with one of the three terminals 21a–21c which, in turn, are electrically connected to nodes 23–25, respectively, of timing circuit 20. With the switch arm 28 in the solid line position, shown in FIGURE 1, and with a voltage $V_{in}$ applied across input terminals 22, the output voltage begins to rise from zero toward a steady state value as the capacitors C1–C3 charge. Time is measured from the instant the input voltage is applied to the instant the output voltage $V_0$ reaches a predetermined value which is less than the steady state voltage.

With the switch means 21 in the solid line position of FIGURE 1, timing circuit 20 follows the time-current characteristic curve 11. When switch arm 28 is moved to position 28′ the timing circuit follows the time-current characteristic curve 12 of FIGURE 2. Finally, when the switch arm is moved to the position 28″ the timing circuit 20 follows the time-current characteristic curve 13 of FIGURE 2.

The values of the passive circuit elements comprising timing circuit 20 are selected so as to produce a very close approximation to the equation $(V_0/V_{in}) = (t/T_0)^{1/2}$.

The relationships between the parameters which guarantee extremely close approximation to the above function are:

$$T1 = R1C1 = 0.0587\, T_0$$
$$R2 = 0.0668\, R1$$
$$R3 = 0.238\, R1$$
$$C2 = 4.66\, C1$$
$$C3 = 10.2\, C1$$

In one practical embodiment it was found that, using the values $T_0 = 15$ and $C1 = 18$ mfd., extremely good results were obtained.

FIGURE 3 shows a static overcurrent relay means 30 designed in accordance with the principles of the instant invention, and employing the timing circuit 20 and switch means 21 of FIGURE 1 therein. Basically, the overcurrent relay means 30 is comprised of a current sensing circuit 40, a pickup circuit 50, the timing circuit 20 (with slope selection switch means 21) and trip circuit 60.

The overcurrent relay means 30 is shown in FIGURE 3 to be protecting a three phase power distribution system, as represented by the conductors $\phi_A$, $\phi_B$ and $\phi_C$, respectively. While the overcurrent relay means 30 is shown as protecting a three phase system, it should be understood that the circuit of FIGURE 3 will yield equally advantageous results when employed to protect systems comprised of a greater or lesser number of phases.

The current sensing circuit 40 is comprised of three full wave rectifier circuits 41–43, respectively, which are inductively coupled to phases $\phi_C$, $\phi_B$ and $\phi_A$ by current transformers CT1–CT3, respectively. Burden resistors R11–R13 are coupled in parallel across current transformers CT1–CT3, respectively. The output terminals 41a–43a of full wave rectifier circuits 41–43 respectively, which are all of the same polarity are coupled to bus 44. Output terminals 41b–43b, which are all of the same polarity are coupled to bus 45. Since the full wave bridge rectifier circuits 41–43 are connected in parallel to busses 44 and 45, it can clearly be seen that the highest voltage of the three phase outputs will be developed across busses 44–45. This voltage will hereafter be referred to as $V_1$.

Voltage $V_1$ appears across timing circuit 20 comprised of passive elements R1–R3 and C1–C3. The lower input terminal 22 of timing circuit 20 is coupled to bus 45. The upper input terminal 22 is coupled to bus 44 through diode means D14. Diode D14 acts to prevent the timing circuit from discharging through neighboring circuits as the voltage goes to zero at each half cycle. The operation of the timing circuit 20 and the slope selection wave means 21 has been described above. The output voltage $V_0$ developed by timing circuit 20 is coupled to the base of transistor Q3 which forms part of the trip circuit 60.

Since any input voltage $V_1$ to timing circuit 20, no matter how small its magnitude, will cause the output voltage $V_0$ to rise toward some steady state value, it is important to provide means to prevent voltage $V_0$ to reach any steady state value at least until the input voltage $V_1$ reaches some predetermined pickup voltage value $V_p$. The value $V_p$ is the closest value of conductor current present in any one of the three phases $\phi_A$–$\phi_C$ which should operate the overcurrent relay means 30. To obtain these results the pickup circuit 50 is employed. The operation of pickup circuit 50 is as follows:

When a voltage $V_1$ is developed, and appears across busses 44 and 45, current flows through diode D15, resistor R7 and Zener diode D16. The current flow through Zener diode D16 establishes a constant voltage $V_r$ between busses 45 and 46. Capacitor C4 coupled in parallel across Zener diode D16 acts as a filtering means for smoothing the voltage appearing across busses 45 and 46.

The input voltage $V_1$ flows through the branch circuit comprised of diode D13 and potentiometer R5, developing a voltage drop across potentiometer R5. A portion of the input voltage $V_1$ is coupled to the base of transistor Q1 through potentiometer R5. If the magnitude of this voltage is less than the magnitude of voltage $V_r$, current will flow from bus 46 through resistor R4, the emitter and base of transistor Q1 and the lower portion of potentiometer R5 to bus 45.

This drives transistor Q1 into conduction causing a current flow through the collector of transistor Q1 and resistor R6 to bus 45. A voltage drop is developed across resistor R6, biasing transistor Q2 into conduction. The collector of transistor Q2 is coupled to the base of transistor Q3. With transistor Q2 in the conducting state, this holds the voltage $V_0$ between the base of transistor Q3 and bus 45, at virtually zero voltage.

If the portion of the voltage across potentiometer R5 which is coupled to the base of transistor Q1 is greater in magnitude than the voltage $V_r$, the base-emitter junction of transistor Q1 is reversed biased, causing transistor Q1 to be in the cutoff state. In this state no current flows in the collector of transistor Q1 so that the base of transistor Q2 is virtually at zero volts. This places transistor Q2 in cutoff condition thereby enabling the voltage $V_0$ to rise. Resistor R6 serves the additional function of providing a path for the collector to base leakage current of transistor Q2. Resistor R6 also restricts the voltage drop from base to emitter at elevated temperatures. Thus it can be seen that the timing output voltage $V_0$ will be maintained at virtually zero volts until a preselected pickup voltage level is developed. The pickup voltage level is adjustable through potentiometer R5.

The particular time-current characteristic slope which the timing circuit 20 will follow, is strictly dependent upon the position to which slope selection switch 21 is moved. In the case where a time-current characteristic having a slope of less than one is desired the switch arm is moved to the position 28″. In certain system protection applications it may be desired to provide an extremely shallow slope, i.e., a slope of very close to zero. In order to obtain such a shallow slope, in addition to positioning the switch 21 with its switch arm in position 28″, a fixed voltage may be applied across node 23 and lower input terminal 22 of timing circuit 20. This voltage may be applied through a resistor R14, the value of which can be very close to zero ohms. The fixed voltage is selected to have a magnitude less than the voltage at node 23 which corresponds to the output voltage $V_0$ which trips the firing circuit. In the circuit of FIGURE 3, this fixed voltage can be provided through the employment of a Zener diode D17 connected in series with resistor R14. This branch circuit is shown in dotted fashion since it is an optional feature. The fixed voltage may be switched into the timing circuit by means of a second switch arm 29 which electrically engages node 23 when the switch arm of switch 21 is in the position 28″, and which is disconnected from node 23 when the switch arm of switch 21 is in either the solid line position 28 or the dotted line position 28′. The alternative switch embodiment 20′ of FIGURE 4 may be employed for this purpose. Switch 20′ is comprised of rotatable first and second switch arms 28 and 29 with first switch arm 28 being coupled to output terminal 27 and with the opposite end thereof being selectively engageable with stationary terminals 21a–21c. Second switch arm 29 is rotatable in synchronism with first arm 28, for example, by being coupled to the same shaft 29a and having a first end connected to the upper terminal of resistor R14 (in the manner shown in FIGURE 3), and having a second end for making selective electrical contact with a stationary contact 31 which is electrically connected to stationary contact 21a through a conductor 32. When switch arm 28 is in electrical engagement with either contact 21a or contact 21b, switch arm 29 is electrically disengaged from contact 31. When switch arm 28 is moved into electrical engagement with contact 21c, second switch arm 29 electrically engages contact 31, thereby electrically coupling the upper terminal of resistor R14 ((see FIGURE 3) to node 23 of timing circuit 20. As another alternative, it should be understood that the series connected resistor and Zener diodes R14 and D17, respectively, may be permanently wired into the circuit in order to avoid the need for a second switch arm 29, as shown in FIGURE 4.

The function of trip circuit 60, shown in FIGURE 3, is to energize a trip coil or relay means 61 when the output voltage $V_0$ of timing circuit 20 reaches a voltage level which is indicative of a tripping operation.

The emitter of transistor Q3 is substantially maintained at a votage $V_f$ by means of a potentiometer R9 which places a portion of the voltage drop $V_r$ developed across potentiometer R9 to the emitter of transintor Q3. When the magnitude of the output voltage $V_0$ is less than the magnitude of voltage $V_f$ transistor Q3 is biased into cutoff and, consequently, no current flows in collector resistor R8. The anode gate of a silicon controlled switch SCS1 is maintained at the same potential as its anode due to the fact that no voltage drop appears across resistor R8.

When the magnitude of voltage $V_0$ is greater than $V_f$ a base current flows in transistor Q3, driving the transistor into conduction so that a collector current flows in resistor R8. The voltage drop across resistor R8 causes the anode gate of silicon controlled switch SCS1 to assume a voltage level smaller than the anode, thereby turning on SCS1. Current now flows through SCS1, developing a voltage drop across resistor R10. This voltage is impressed upon the gate of silicon controlled rectifier SCR1 thereby providing a low impedance path between busses 44 and 45 through the series connected relay coil 61 and silicon controlled rectifier SCR1. The current flowing through this low impedance path energizes the tripping coil to initiate a tripping operation of a circuit breaker (not shown), or other circuit interrupting device in accordance with the timing characteristic of timing circuit 20.

In overcurrent relays of the type described herein it is required that the time-current characteristic be adjustable over a predetermined range. This adjustment is provided through the control of voltage level $V_f$ through the manual setting of potentiometer R9.

It can be seen from the foregoing that the instant invention provides a novel static overcurrent relay means comprised solely of solid state circuit elements in which a single overcurrent relay structure is provided with sufficient flexibility so as to be usable in power distribution network applications having differing time-current characteristics, with the slope selection being obtained through the use of a simple and easy to use slope selection switch means.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. For use in protecting current distribution networks static overcurrent relay means responsive to overcurrent conditions for operating circuit protective devices after a predetermined time period and before the network is damaged comprising first means for generating a D.C. voltage representative of the current being monitored in said network; second means coupled to said first means for generating a predetermined voltage level after a predetermined time delay in accordance with a time-current characteristic slope; third means coupled to said first means and normally inhibiting the operation of said second means until the output voltage level of said first means achieves a predetermined magnitude; fourth means coupled to said second means for energizing a circuit protective device when the output voltage of said second means achieves a second predetermined magnitude; said second means being comprised of a plurality of circuit elements and having a plurality of output terminals; fifth means comprising slope selection switching means manually operable to selectively couple one of said second means output terminals to said fourth means for altering the time-current characteristic developed by said second means.

2. The device of claim 1 wherein said first means is comprised of current transformer means; and full wave rectification means connected across the output of said current transformer means for generating said D.C. voltage.

3. The device of claim 1 wherein said second means is comprised of a passive network of resistive and reactive elements for generating the desired time delay.

4. The device of claim 2 wherein said second means is comprised of a passive network of resistive and reactive elements for generating the desired time delay.

5. The device of claim 1 wherein said second means is comprised of a passive network of resistive and reactive elements for generating the desired time delay substantially in accordance with the equation $$\left(\frac{V_0}{V_1}\right) = \left(\frac{t}{T}\right)^{1/2}$$

where:

$V_0$ is the output voltage of said timing circuit
$V_1$ is the input voltage to said timing circuit
$t$ is elapsed time, and $$T = \frac{T_1}{V_0}$$

where $T_1 =$ time constant of the timing circuit.

6. The device of claim 1 wherein said third means is comprised of series connected diode means and resistance means connected to the output of said first means; first semiconductor means connected between said diode means and the output of said first means; second semiconductor means connected to said first transistor means and being normally biased to inhibit the energization of said second means when the D.C. voltage output of said first means is below said first predetermined magnitude.

7. The device of claim 6 wherein said diode means is a Zener diode.

8. The device of claim 1 wherein said fourth means is comprised of unijunction transistor means coupled to the output of said second means; silicon controlled rectifier means connected to said unijunction transistor means; and trip coil means connected in series with said silicon controlled rectifier means and energizable for activating a protective device.

9. The device of claim 1 wherein said fourth means is comprised of first and second transistor means coupled to said second means; third transistor means coupled between said first and second transistor means for driving said second transistor means into conduction upon conduction of said first transistor means; feedback means connected between said first and second transistor means for maintaining said first transistor means conductive upon conduction of said second transistor means; series connected trip coil means and silicon controlled rectifier means coupled across said first means; said second transistor means being connected to said silicon controlled rectifier means for energizing said trip coil to operate a protective device.

10. The device of claim 1 wherein said fifth means is further comprised of second manually operable switching means; fixed voltage supply means coupled to one output terminal of said second means through said second selective switching means for further reducing the time-current characteristic slope generated by said second means.

11. The device of claim 1 wherein said second means is comprised of passive circuit elements; said second means having at least three output terminals; said fifth means having at least three discreet positions for selectively coupling said fourth means to one of said second means output terminals; the slope of the time-current characteristics generated by said second means each being different from one another.

References Cited

UNITED STATES PATENTS 3,167,686   1/1965   Riebs _____ 317—22

MILTON O. HIRSHFIELD, *Primary Examiner.*

J. D. TRAMMELL, *Assistant Examiner.*